US 11,639,436 B2

(12) United States Patent
Robb et al.

(10) Patent No.: US 11,639,436 B2
(45) Date of Patent: May 2, 2023

(54) HIGH MELT STRENGTH POLYPROPYLENE AND PROCESS OF PREPARATION THEREOF

(71) Applicant: FINA TECHNOLOGY, INC., Houston, TX (US)

(72) Inventors: Brett Robb, Phoenixville, PA (US); Steven A. Schwartz, Downingtown, PA (US)

(73) Assignee: FINA TECHNOLOGY, INC.

( * ) Notice: Subject to any disclaimer, the term of this patent is extended or adjusted under 35 U.S.C. 154(b) by 142 days.

(21) Appl. No.: 17/212,772

(22) Filed: Mar. 25, 2021

(65) Prior Publication Data
US 2021/0301114 A1 Sep. 30, 2021

Related U.S. Application Data

(60) Provisional application No. 63/000,174, filed on Mar. 26, 2020.

(51) Int. Cl.
C08L 23/12 (2006.01)
B29C 48/00 (2019.01)
C08F 222/02 (2006.01)
C08J 3/22 (2006.01)
C08K 3/22 (2006.01)
(Continued)

(52) U.S. Cl.
CPC ............ C08L 23/12 (2013.01); B29C 48/022 (2019.02); C08F 222/02 (2013.01); C08J 3/226 (2013.01); C08K 3/22 (2013.01); C08L 23/14 (2013.01); C08L 51/06 (2013.01); B29C 2948/9238 (2019.02); C08K 2003/2296 (2013.01); C08L 2201/08 (2013.01); C08L 2203/30 (2013.01);
(Continued)

(58) Field of Classification Search
CPC ............ C08L 23/12; C08K 2003/2296; C08F 222/02; C08F 255/02
See application file for complete search history.

(56) References Cited

U.S. PATENT DOCUMENTS 5,209,485 A 5/1993 Nesbitt et al.
6,602,956 B2 8/2003 Zhao et al.
(Continued)

FOREIGN PATENT DOCUMENTS

CN 105482258 A 4/2015
WO 2012049690 A1 4/2012

OTHER PUBLICATIONS

International Search Report and Written Opinion for International Application No. PCT/US2021/024055, dated Jul. 23, 2021, 11 pages.
(Continued)

Primary Examiner — Mark S Kaucher
(74) Attorney, Agent, or Firm — Albert Shung

(57) ABSTRACT

A high melt strength resin composition includes at least a) non-functionalized polypropylene, b) at least one acrylate such as zinc diacrylate, calcium diacrylate or aluminum triacrylate in a total amount of from 0.1 to 5% by weight based on the weight of non-functionalized polypropylene, and c) at least one acid neutralizer in a total amount of from 0.005 to 5% by weight based on the total weight of the at least one acrylate. The resin composition is compounded at a processing temperature between 185° C. and 260° C. to obtain the high melt strength polypropylene.

34 Claims, 1 Drawing Sheet

(51) Int. Cl.
*C08L 23/14* (2006.01)
*C08L 51/06* (2006.01)

(52) U.S. Cl.
CPC ....... *C08L 2314/02* (2013.01); *C08L 2314/06* (2013.01)

(56) References Cited

U.S. PATENT DOCUMENTS

| | | | |
|---|---|---|---|
| 6,691,569 B1 | 2/2004 | Sentmanat | |
| 6,778,413 B2 | 8/2004 | Kates | |
| 9,045,615 B2 | 6/2015 | Austin et al. | |
| 2007/0044861 A1 | 3/2007 | Stewart et al. | |
| 2012/0220730 A1* | 8/2012 | Li | C08F 10/06 525/379 |
| 2014/0276517 A1* | 9/2014 | Chester | D04H 3/05 442/364 |
| 2014/0377512 A1* | 12/2014 | Rogers | B41M 1/30 493/187 |
| 2015/0031838 A1* | 1/2015 | Li | C08J 9/122 525/274 |
| 2015/0315349 A1 | 11/2015 | Tippet et al. | |
| 2016/0237239 A1* | 8/2016 | Cortes | C08J 9/125 |
| 2020/0010656 A1 | 1/2020 | Cheng et al. | |

OTHER PUBLICATIONS

International Preliminary Report on Patentability and Written Opinion for International Application No. PCT/US2021/024055, dated Sep. 22, 2022, 6 pages.

* cited by examiner

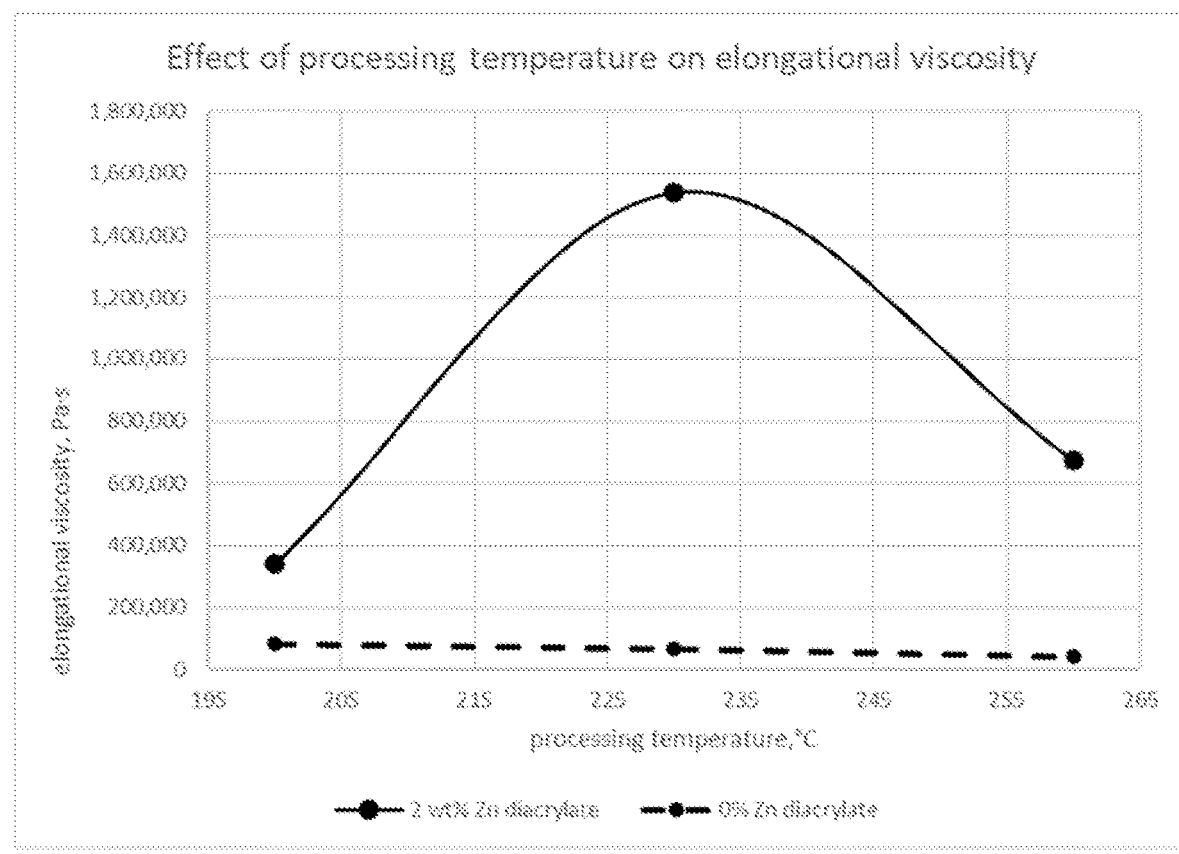

HIGH MELT STRENGTH POLYPROPYLENE AND PROCESS OF PREPARATION THEREOF

CROSS-REFERENCE TO RELATED APPLICATIONS

The present application claims priority to U.S. Provisional Patent Application No. 63/000,174, filed Mar. 26, 2020, entitled "HIGH MELT STRENGTH POLYPROPYLENE AND PROCESS THEREOF" the contents of which is incorporated herein by reference in its entirety for all purposes.

FIELD OF THE INVENTION

The present invention generally relates to high melt strength polypropylene and methods for preparing high melt strength polypropylene.

BACKGROUND OF THE RELATED ART

Polypropylene is a widely used plastic that has high modulus, high tensile strength, good heat resistance, and other favorable properties in the solid-state. However, due to its linear molecular architecture, polypropylene generally has relatively poor melt strength, which negatively affects its processability. Low melt strength limits polypropylene resins in a number of applications, such as foaming, sheet extrusion thermoforming, extrusion blow molding, extrusion coating, and the like.

Alternative approaches to the production of high melt strength polypropylene are described in U.S. Pat. Pub. Nos. 2012/0220730 A1 and US 2015/0031838 A1.

One way to increase the melt strength of polypropylene is by the addition of long-chain branches to the polymer structure. On the other hand, long chain branches bonded within the polymer structure can make the polymer too rigid, compromising the polymer's thermoplastic character. Thus, the development of methods for making high melt strength polypropylene (HMS-PP) without sacrificing other desirable attributes would be of much interest.

SUMMARY OF THE INVENTION

Polypropylene generally has low melt viscosity. This limits (narrows) its processing window during forming operations such as foam extrusion, sheet extrusion, thermoforming, blow molding, extrusion coatings, and film formation and also reduces the properties of articles formed by such processes. The present invention overcomes such limitations by reactively blending an acrylate such as zinc diacrylate with polypropylene in the presence of an acid neutralizer such as zinc oxide.

When melt extruding resin compositions containing an acrylate such as zinc diacrylate and a polypropylene, it was unexpectedly discovered that melt strength enhancement in the resulting compounded polypropylene is maximized when compounding (process) temperatures are controlled between 185° C. and 260° C. and alternatively between 220° C. and 240° C.

It was also surprisingly discovered that the presence of an acid neutralizer (e.g., zinc oxide) during compounding of a polypropylene with an acrylate effectively reduces the content of unreacted acrylic acid in the extruded polypropylene and further increases the melt strength of the compounded polypropylene (as compared to the melt strength of an analogous polypropylene/acrylate composition compounded at the same processing conditions in the absence of acid neutralizer). Melt strength, as used herein, is measured as the elongational viscosity at 170° C. and a strain rate of $0.1~s^{-1}$ after conditioning for 5 minutes at 170° C. on a sample prepared as described in the Examples.

One embodiment of the invention provides a resin composition useful for preparing a high melt strength polypropylene, wherein the resin composition comprises a) non-functionalized polypropylene, b) at least one acrylate selected from the group consisting of zinc diacrylate, calcium diacrylate and aluminum triacrylate in a total amount of from 0.1 to 5% by weight based on the weight of non-functionalized polypropylene, and c) at least one acid neutralizer in a total amount of from 0.005 to 5% by weight based on the total weight of the at least one acrylate.

According to another embodiment, the invention provides a method of making a high melt strength polypropylene, comprising compounding a resin composition comprised of a) non-functionalized polypropylene, b) at least one acrylate selected from the group consisting of zinc diacrylate, calcium diacrylate and aluminum triacrylate in a total amount of from 0.1 to 5% by weight based on the weight of non-functionalized polypropylene, and c) at least one acid neutralizer in a total amount of from 0.005 to 5% by weight based on the total weight of the at least one acrylate at a processing temperature between 185° C. and 260° C.

The present invention, in a further embodiment, provides a high melt strength polypropylene obtained by compounding a resin composition comprised of a) non-functionalized polypropylene, b) at least one acrylate selected from the group consisting of zinc diacrylate, calcium diacrylate and aluminum triacrylate in an amount of from 0.1 to 5% by weight based on the weight of non-functionalized polypropylene, and c) at least one acid neutralizer in a total amount of from 0.005 to 5% by weight based on the total weight of the at least one acrylate at a processing temperature between 185° C. and 260° C.

BRIEF DESCRIPTION OF THE DRAWING

The FIGURE shows the effect of processing temperature on elongational viscosity.

DETAILED DESCRIPTION OF THE INVENTION

Resin compositions in accordance with the present invention include at least the following components: a) non-functionalized polypropylene, b) at least one acrylate selected from the group consisting of zinc diacrylate, calcium diacrylate and aluminum triacrylate in a total amount of from 0.1 to 5% by weight based on the weight of non-functionalized polypropylene, and c) at least one acid neutralizer in a total amount of from 0.005 to 5% by weight based on the total weight of the at least one acrylate.

Non-Functionalized Polypropylene

The polypropylenes used in the resin compositions of the present invention are non-functionalized polypropylenes, meaning that the polypropylenes do not bear or contain any functional groups such as carboxylic acid or anhydride functional groups. However, as a result of chemical and/or grafting reactions that may occur when the resin compositions are compounded, the high melt strength polypropylenes thereby obtained may contain polymer backbones that are substituted to some extent with functional groups such as acrylic acid groups and/or acrylate groups. These polypropylenes may be prepared using any polymerization methods as are known and used in the art. For example, suitable polypropylene can be prepared using Ziegler-Natta catalysts, metallocene catalysts or free-radical initiation.

Suitable non-functionalized polypropylenes include both polypropylene homopolymers and polypropylene copolymers (wherein propylene monomer has been copolymerized with one or more comonomers, provided such comonomers do not include any functionalized comonomers). Suitable comonomers include, for example, olefinic comonomers such as ethylene, propylene, butenes, pentenes, hexenes, heptenes, octenes, nonenes, decenes and the like and alpha-olefins generally.

According to certain embodiments, the total amount of such comonomers in the polypropylene copolymer is limited as compared to the amount of propylene, e.g., the polypropylene copolymer may contain one or more non-functionalized comonomers in a total amount of not more than 20% by weight, not more than 15% by weight, not more than 5% by weight, not more than 2% by weight, or not more than 1% by weight, with the balance being propylene.

In other embodiments of the invention, however, the non-functionalized polypropylene is an alloy of polypropylene with at least one other polymer. For example, at least one other polymer could be present in the alloy in an amount up to 50% by weight, up to 40% by weight, up to 30% by weight, up to 20% by weight, up to 10% by weight or up to 5% by weight, based on the total weight of the alloy (the balance being a polypropylene homopolymer and/or polypropylene copolymer). The use of blends or alloys of polypropylene homopolymers and polypropylene copolymers is also possible.

Suitable polypropylenes include propylene random copolymers, propylene impact copolymers, syndiotactic polypropylenes, isotactic polypropylenes, and atactic (amorphous) polypropylenes.

The non-functionalized polypropylene may have a molecular weight distribution ($M_w/M_n$) of from 1.0 to about 50, or from about 1.5 to about 15 or from about 2 to about 12, for example.

The non-functionalized polypropylene may have a melting point ($T_m$) (as measured by DSC) of at least about 100° C., or from about 115° C. to about 175° C. or from about 128° C. to about 173° C., for example.

The non-functionalized polypropylene may include about 15 wt. % or less, or about 12 wt. % or less, or about 10 wt. % or less, or about 6 wt. % or less, or about 5 wt. % or less, or about 4 wt. % or less of xylene soluble material (XS), for example (as measured by ASTM D5492-06).

The non-functionalized polypropylene may have a density (as measured by ASTM D1505-18) of from about 0.880 to about 0.925 g/cm$^3$, for example.

The non-functionalized polypropylene may have, for example, a melt flow index (MFI) of from 0.2 to 2000 g/10 min or from 1 to 50 g/10 min (2.16 Kg, 230° C.).

Mixtures or blends of two or more different non-functionalized polypropylenes may be employed in the resin composition.

According to certain embodiments of the invention, the resin composition contains either no amount or a limited amount of any type of polymer other than non-functionalized polypropylene. For example, the resin composition may comprise not more than 10% by weight, not more than 5% by weight, not more than 1% by weight, or 0% by weight, based on the total weight of the resin composition, of any type of polymer other than non-functionalized polypropylene.

Acrylate

Useful acrylates in accordance with the present invention may be selected from zinc diacrylate, calcium diacrylate, aluminum triacrylate and combinations or mixtures thereof. Zinc diacrylate is generally preferred.

Such acrylates are present in the resin composition used to make a high melt strength polypropylene in a total amount of from 0.1 to 5% by weight based on the weight of non-functionalized polypropylene. According to certain embodiments, the resin composition contains 0.5 to 3% by weight of one or more such acrylates (e.g., zinc diacrylate) based on the weight of non-functionalized polypropylene. The acrylates may be added to the resin composition as a masterbatch.

Acid Neutralizer

In the context of the present invention, the term "acid neutralizer" includes any substance capable of neutralizing a carboxylic acid, in particular acrylic acid. That is, an acid neutralizer at least partially deprotonates a carboxylic acid, especially at the temperatures and conditions encountered during compounding of the resin composition. As a result of such neutralization, the carboxylic acid may be at least partially converted to a corresponding salt. For example, zinc oxide may react with acrylic acid to form zinc diacrylate (with water being generated as a co-product of such reaction).

Types of acid neutralizers include, but are not limited to, metal oxides, metal hydroxides, alkali metal hydroxides, alkali metal carbonates, alkaline earth metal oxides, alkaline earth metal carbonates, alkali metal bicarbonates, metal carboxylates, alkali metal carboxylates, alkaline earth metal carboxylates and combinations thereof. Compounds including polyvalent metals (e.g., zinc, titanium) or alkaline earth metals (e.g., calcium, barium, magnesium) are suitable acid neutralizers. Specific examples of suitable acid neutralizers include zinc oxide, zinc hydroxide, calcium oxide, barium oxide, magnesium oxide, titanium dioxide, sodium carbonate, sodium bicarbonate, calcium carbonate, magnesium carbonate, sodium hydroxide, potassium hydroxide, zinc salts of fatty acids (e.g., zinc stearate), calcium salts of fatty acids (e.g., calcium stearate), and combinations thereof. Alternatively, the at least one acid neutralizer includes zinc oxide.

Generally speaking, the resin compositions of the present invention include one or more acid neutralizers in a total amount of from 0.005 to 5% by weight based on the total weight of the at least one acrylate. For example, a resin composition may comprise from 1 to 3% by weight in total, based on the total weight of the at least one acrylate, of one or more acid neutralizers such as zinc oxide (ZnO). The acid neutralizer may be added separately to the resin composition or may be incorporated as a non-neutralized part of the acrylate component, or may be added as a masterbatch.

Either or both of the acrylate and the acid neutralizer may be provided in the form of a masterbatch. Suitable carrier resins for the masterbatch are polyolefin resins, which may be selected from polypropylene, polyethylene, mixtures thereof and copolymers thereof. The high strength polypropylene resin composition may then be prepared by combining the masterbatch with the polypropylene resin. The masterbatches are prepared by compounding the acrylate and/or the acid neutralizer with the carrier resin at temperatures of 190° C. or less. The masterbatch may include from 40 to 70% by weight of the acrylate. If the masterbatch includes both acrylate and the acid neutralizer, the masterbatch may include from 0.005 to 5% by weight of the acid neutralizer based on the total weight of the at least one acrylate. For example, a masterbatch including both the acid neutralizer and the acrylate may comprise from 1 to 3% by weight in total, based on the total weight of the at least one acrylate, of one or more acid neutralizers such as zinc oxide (ZnO). If the masterbatch includes only the acid neutralizer, the masterbatch may include from 1 to 25 wt % of the acid neutralizer.

As used herein, the term "masterbatch" means a resin composition in which there is an additives concentration of from 5 to 90 wt %, alternatively from 20 to 80 wt %, alternatively from 40 to 70 wt %. In the present disclosure, a polyolefin carrier includes either or both of the acrylate and the acid neutralizer may be used as a masterbatch for these additives. The masterbatch is used to proportion additives accurately into large bulks of resin.

Other Additives

One or more further additives other than the acrylate and acid neutralizer can be included in the resin composition comprised of at least one polypropylene, such as antioxidants, fillers other than acid neutralizers, colorants other than acid neutralizers, fire retardants other than acid neutralizers, blowing agents other than acid neutralizers, clarifiers, anti-scratch additives, anti-dust additives, nucleating agents, and stabilizers and combinations thereof. Typically, if any such additives are present in the resin composition, they are present in amounts not greater than 5% by weight based on the weight of the resin composition.

Improvements in the melt strength of a non-functionalized polypropylene are achieved via dispersion of an acrylate (zinc diacrylate, calcium diacrylate and/or aluminum triacrylate) in a polymer melt in the presence of an acid neutralizer, reactive grafting in a polymer melt of the acrylate moiety of the acrylate to the non-functionalized polypropylene, followed by association of the zinc, calcium and/or aluminum ions in a post-melt-extrusion conversion process to produce sheet, foam, film and formed or molded parts. Compounding of the resin composition comprising, consisting essentially of or consisting of polypropylene, acrylate and acid neutralizer) may be carried out using any suitable apparatus capable of intimately admixing the resin composition at an effective process temperature, as described in more detail hereafter, such as a single or twin screw extruder, a banbury mixer, or a roll mill.

The components of the resin composition can be combined using reactive blending, such as reactive extrusion, to form a high melt strength polypropylene. Typically, the formation of the high melt strength polypropylene involves a single reactive extrusion, although subjecting the initially obtained composition to one or more further extrusions is also possible. Such a process can be performed using any extruder type, such a twin-screw extruder. The extruder can be a device that extrudes pellets as well as an extruder which produces sheet, or any other known type of extruded article.

The compounding is performed at a processing temperature above the melting point of the polypropylene, in particular at a processing temperature between 185° C. and 260° C. (including the limits of such range). It has been discovered that the melt strength of the polypropylene may be enhanced by operating within the aforementioned processing temperature, especially within a processing temperature range between 220° C. and 240° C. or between 225° C. and 235° C. (limits included). Subjecting the resin composition to compounding at a processing temperature of about 230° C. in particular has been found to yield a maximum in the melt strength of the polypropylene thereby obtained.

That is, increasing the processing temperature of the compounding above about 230° C. results in decreased melt strength.

However, high melt strength polypropylenes in accordance with the present invention can vary greatly in mechanical and other properties, as there are many possible embodiments within the scope of the invention. Generally, the high melt strength polypropylenes produced from resin compositions in accordance with the present invention show enhanced melt strength relative to the neat non-functionalized polypropylene employed as a component of the starting resin composition, as indicated by increased torque, dynamic rheology, and elongational viscosity, for example. For example, the elongational viscosity measured at a strain rate of 0.1 $s^{-1}$ at 170° C. of the high melt strength polypropylenes may be at least 25%, at least 50%, at least 100%, at least 150%, at least 200%, at least 300%, at least 400%, at least 500%, at least 600%, at least 700%, at least 800%, at least 900%, at least 1000%, or at least 1500% higher than the elongational viscosity measured at a strain rate of 0.1 $s^{-1}$ at 170° C. of the non-functionalized polypropylene employed as a component of the starting resin composition. The increase in elongational viscosity of the enhanced melt strength polypropylene may range from 25% to 2000%, or from 25% to 1500%, or from 50% to 1500%, or from 100% to 1250%, or from 200% to 1250%, or from 300% to 1000%, or from 100% to 900%, or from 150% to 1000%. Further, as a consequence of the inclusion of an acid neutralizer in the resin composition which is processed to form the high melt strength polypropylene, the high melt strength polypropylene contains reduced levels of free acrylic acid, as compared to a comparable polypropylene compound which has been processed under the same conditions in the absence of acid neutralizer. Including acid neutralizer in the resin composition has the further desirable effect of increasing the melt strength.

The high melt strength polypropylenes of the present invention can be used alone or as masterbatches for blending with other polymer resins, such as polypropylene homopolymers, impact copolymers, and the like.

The high melt strength polypropylenes produced in accordance with the invention can be suitable for many applications, including all known applications of linear polypropylene. For instance, the high melt strength polypropylene of the present invention can be suitable for foaming, sheet extrusion thermoforming, extrusion blow molding, extrusion coating, fiber, film, and similar applications.

In one embodiment, the invention is a method of making high melt strength polypropylene that includes reactively blending a combination of a non-functionalized polypropylene; an acrylate selected from the group consisting of zinc diacrylate, calcium diacrylate and aluminum triacrylate; and an acid neutralizer and recovering a polypropylene product of enhanced melt strength (as compared to the starting non-functionalized polypropylene).

In an embodiment, an article can be obtained by subjecting the high melt strength polypropylene in accordance with the invention to a plastics shaping process such as foam extrusion, sheet extrusion, film extrusion, thermoforming (including sheet extrusion thermoforming), blow molding (including extrusion blow molding, injection blow molding, and injection stretch blow molding), extrusion coating, and the like. The high melt strength polypropylene may be formed into end use articles such as for example, packaging, office supplies, structural supports, laminate compositions, polymeric foam substrates, decorative surfaces, outdoor furniture, point-of-purchase signs and displays, housewares and consumer goods, building insulation, cosmetics packaging, outdoor replacement materials, lids and food/beverage containers, appliances, utensils, electronic components, automotive parts, enclosures, medical supplies, toys, piping, and the like.

Illustrative, non-limiting aspects of the invention may be summarized as follows:

Aspect 1: A resin composition for use in a high melt strength polypropylene, the resin composition comprising, consisting essentially of, or consisting of a) non-functionalized polypropylene, b) at least one of zinc diacrylate, calcium diacrylate or aluminum triacrylate in a total amount of from 0.1 to 5% by weight based on the weight of non-functionalized polypropylene, and c) at least one acid neutralizer in a total amount of from 0.005 to 5% by weight based on the total weight of the at least one acrylate.

Aspect 2: The resin composition of Aspect 1, wherein the acid neutralizer includes at least one of metal oxides, metal hydroxides, alkali metal hydroxides, alkali metal carbonates, alkaline earth metal oxides, alkaline earth metal carbonates, alkali metal bicarbonates, metal carboxylates, alkali metal carboxylates, alkaline earth metal carboxylates or combinations thereof.

Aspect 3: The resin composition of Aspect 1 or 2, wherein the acid neutralizer includes at least one of zinc oxide, zinc hydroxide, calcium oxide, barium oxide, magnesium oxide, titanium dioxide, sodium carbonate, sodium bicarbonate, calcium carbonate, magnesium carbonate, sodium hydroxide, potassium hydroxide, zinc salts of fatty acids, calcium salts of fatty acids, or combinations thereof.

Aspect 4: The resin composition of any of Aspects 1 to 3, wherein the at least one acid neutralizer includes zinc oxide.

Aspect 5: The resin composition of any of Aspects 1 to 4, including zinc diacrylate.

Aspect 6: The resin composition of any of Aspects 1 to 5, wherein the resin composition is free of organic peroxide.

Aspect 7: The resin composition of any of Aspects 1 to 6, wherein the non-functionalized polypropylene has a melt flow index (MFI) of from 0.2 to 2000 g/10 min (2.16 Kg, 230° C.).

Aspect 8: The resin composition of any of Aspects 1 to 7, wherein the non-functionalized polypropylene is at least one of polypropylene homopolymers, polypropylene copolymers, or alloys of polypropylene with at least one additional polymer.

Aspect 9: The resin composition of any of Aspects 1 to 8, wherein the non-functionalized polypropylene is prepared using at least one Ziegler-Natta catalyst.

Aspect 10: The resin composition of any of Aspects 1 to 8, wherein the non-functionalized polypropylene is prepared using at least one metallocene catalyst.

Aspect 11: The resin composition of any of Aspects 1 to 8, wherein the non-functionalized polypropylene is prepared using free-radical initiation.

Aspect 12: The resin composition of any of Aspects 1 to 11, comprising 0.5 to 3% by weight in total of the at least one of zinc diacrylate, calcium diacrylate or aluminum triacrylate.

Aspect 13: The resin composition of any of Aspects 1 to 12, additionally comprising one or more additives selected from the group consisting of antioxidants, fillers other than acid neutralizers, colorants other than acid neutralizers, fire retardants other than acid neutralizers, blowing agents other than acid neutralizers, clarifiers, anti-scratch additives, anti-dust additives, nucleating agents, and stabilizers.

Aspect 14: A method of making a high melt strength polypropylene, comprising the step of compounding, at a processing temperature between 185° C. and 260° C., a resin composition comprised of, consisting essentially of or consisting of a) non-functionalized polypropylene; b) at least one of zinc diacrylate, calcium diacrylate or aluminum triacrylate in a total amount of from 0.1 to 5% by weight based on the weight of non-functionalized polypropylene, and c) at least one acid neutralizer in a total amount of from 0.005 to 5% by weight based on the total weight of the at least one acrylate.

Aspect 15: The method of Aspect 14, wherein the processing temperature is between 220° C. and 240° C.

Aspect 16: The method of Aspect 14 or 15, wherein the processing temperature is about 230° C.

Aspect 17: The method of any of Aspects 14 to 16, wherein the compounding is carried out using a single or twin screw extruder, a banbury mixer, or a roll mill.

Aspect 18: The method of any of Aspects 14 to 17, wherein the resin composition is melt extruded.

Aspect 19: The method of any of Aspects 14 to 18, whereby an acrylate moiety from the at least one of zinc diacrylate, calcium diacrylate or aluminum triacrylate is grafted to the non-functionalized polypropylene as a result of the compounding.

Aspect 20: The method of any of Aspects 14 to 19, wherein the acid neutralizer comprises at least of metal oxides, metal hydroxides, alkali metal hydroxides, alkali metal carbonates, alkaline earth metal oxides, alkaline earth metal carbonates, alkali metal bicarbonates, metal carboxylates, alkali metal carboxylates, alkaline earth metal carboxylates or combinations thereof.

Aspect 21: The method of any of Aspects 14 to 20, wherein the acid neutralizer includes at least of zinc oxide, zinc hydroxide, calcium oxide, barium oxide, magnesium oxide, titanium dioxide, sodium carbonate, sodium bicarbonate, calcium carbonate, magnesium carbonate, sodium hydroxide, potassium hydroxide, zinc salts of fatty acids, calcium salts of fatty acids, or combinations thereof.

Aspect 22: The method of any of Aspects 14 to 21, wherein the at least one acid neutralizer includes zinc oxide.

Aspect 23: The method of any of Aspects 14 to 22, including zinc diacrylate.

Aspect 24: The method of any of Aspects 14 to 23, wherein the resin composition is free of organic peroxide.

Aspect 25: The method of any of Aspects 14 to 24, wherein the non-functionalized polypropylene has a melt flow index (MFI) of from 0.2 to 2000 g/10 min (2.16 Kg, 230° C.).

Aspect 26: The method of any of Aspects 14 to 25, wherein the non-functionalized polypropylene is at least one of polypropylene homopolymers, polypropylene copolymers, or alloys of polypropylene with at least one additional polymer.

Aspect 27: The method of any of Aspects 14 to 26, wherein the resin composition comprises 0.5 to 3% by weight in total of the at least one of zinc diacrylate, calcium diacrylate or aluminum triacrylate based on the weight of non-functionalized polypropylene.

Aspect 28: The method of any of Aspects 14 to 27, wherein the resin composition additionally comprises at least one of antioxidants, fillers other than acid neutralizers, colorants other than acid neutralizers, fire retardants other than acid neutralizers, blowing agents other than acid neutralizers, clarifiers, anti-scratch additives, anti-dust additives, nucleating agents, and stabilizers.

Aspect 29. The method of any of Aspects 14 to 26, wherein at least one of the acrylate and the acid neutralizer are in the form of a masterbatch comprising a polyolefin as a carrier resin for the masterbatch.

Aspect 30: A high melt strength polypropylene obtained by compounding a resin composition comprised of, consisting essentially of or consisting of a) non-functionalized polypropylene, b) at least one of zinc diacrylate, calcium diacrylate or aluminum triacrylate in an amount of from 0.1 to 5% by weight based on the weight of non-functionalized polypropylene, and c) at least one acid neutralizer in a total amount of from 0.005 to 5% by weight based on the total weight of the at least one acrylate at a processing temperature between 185° C. and 260° C.

Aspect 31: The high melt strength polypropylene of Aspect 30, wherein the processing temperature is between 220° C. and 240° C.

Aspect 32: The high melt strength polypropylene of Aspect 30 or 31, wherein the processing temperature is about 230° C.

Aspect 33: The high melt strength polypropylene of any of Aspects 30 to 32, wherein the acid neutralizer includes at least one of metal oxides, metal hydroxides, alkali metal hydroxides, alkali metal carbonates, alkaline earth metal oxides, alkaline earth metal carbonates, alkali metal bicarbonates, metal carboxylates, alkali metal carboxylates, alkaline earth metal carboxylates or combinations thereof.

Aspect 34: The high melt strength polypropylene of any of Aspects 30 to 33, wherein the at least one acid neutralizer includes at least one of zinc oxide, zinc hydroxide, calcium oxide, barium oxide, magnesium oxide, titanium dioxide, sodium carbonate, sodium bicarbonate, calcium carbonate, magnesium carbonate, sodium hydroxide, potassium hydroxide, zinc salts of fatty acids, calcium salts of fatty acids, or combinations thereof.

Aspect 35: The high melt strength polypropylene of any of Aspects 30 to 34, wherein the at least one acid neutralizer includes zinc oxide.

Aspect 36: The high melt strength polypropylene of any of Aspects 30 to 35, including zinc diacrylate.

Aspect 37: The high melt strength polypropylene of any of Aspects 30 to 36, wherein the resin composition is free of organic peroxide.

Aspect 38: The high melt strength polypropylene of any of Aspects 30 to 37, wherein the non-functionalized polypropylene has a melt flow index (MFI) of from 0.2 to 2000 g/10 min (2.16 Kg, 230° C.).

Aspect 39: The high melt strength polypropylene of any of Aspects 30 to 38, wherein the non-functionalized polypropylene is at least one of polypropylene homopolymers, polypropylene copolymers, or alloys of polypropylene with at least one additional polymer.

Aspect 40: The high melt strength polypropylene of any of Aspects 30 to 39, wherein the resin composition is comprised of 0.5 to 3% by weight zinc diacrylate.

Aspect 41: The high melt strength polypropylene of any of Aspects 30 to 40, additionally comprising at least one of antioxidants, fillers other than acid neutralizers, colorants other than acid neutralizers, fire retardants other than acid neutralizers, blowing agents other than acid neutralizers, clarifiers, anti-scratch additives, anti-dust additives, nucleating agents, or stabilizers.

Aspect 42: The high melt strength polypropylene of any of Aspects 30 to 41, having an elongational viscosity of at least 1,000,000 Pa·s measured at a strain rate of 0.1 s$^{-1}$ at 170° C.

Aspect 43: The high melt strength polypropylene of any of Aspects 30 to 41, having an elongational viscosity of at least 500,000 Pa·s measured at a strain rate of 0.1 s$^{-1}$ at 170° C.

Aspect 44: The high melt strength polypropylene of any of Aspects 30 to 41, having an elongational viscosity at least 25% higher than an elongational viscosity of the non-functionalized polypropylene measured at a strain rate of 0.1 s$^{-1}$ at 170° C.

Aspect 45: The high melt strength polypropylene of any of Aspects 30 to 41, having an elongational viscosity measured at a strain rate of 0.1 s$^{-1}$ at 170° C. of from 25% to 2000% higher than an elongational viscosity of the non-functionalized polypropylene.

Aspect 46: The high melt strength polypropylene of any of Aspects 30 to 45, wherein the compounding is carried out using a single or twin screw extruder, a banbury mixer, or a roll mill.

Aspect 47: The high melt strength polypropylene of any of Aspects 30 to 46, wherein the resin composition is melt extruded.

Aspect 48: The high melt strength polypropylene of any of Aspects 30 to 47, wherein an acrylate moiety from the at least one of zinc diacrylate, calcium diacrylate or aluminum triacrylate is grafted to the non-functionalized polypropylene to provide acrylate-functionalized polypropylene chains and grafted acrylate groups on the acrylate-functionalized polypropylene chains are present in the form of polyvalent metal or alkaline earth metal salts.

Aspect 49: The high melt strength polypropylene of any of Aspects 30 to 48, wherein the at least one of zinc diacrylate, calcium diacrylate or aluminum triacrylate; or the acid neutralizer are in the form of a masterbatch comprising a polyolefin as a carrier resin for the masterbatch.

Aspect 50: A polymeric article comprising, consisting essentially of or consisting of the high melt strength polypropylene of any of Aspects 30 to 46.

Aspect 51: The polymeric article of Aspect 50, wherein the polymeric article is a foamed article, a sheet extruded article, a thermoformed article, a blow molded article, a roto-molded article, an extrusion-coated article, a cast article, an injection molded article, a pressed article, a fiber or a film.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the invention. Additionally, in some embodiments, the invention can be construed as excluding any element or process step not specified herein.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

EXAMPLES

In all of the following Examples the melt strength was measured as the elongational viscosity. The elongational viscosity was measured as follows:

The samples were compression molded from pellets into 2 mm films. The pellets were melted at 210° C. for 5 minutes with the mold resting in contact with both the top and bottom platens. Then, 20,000 lbs of pressure was applied for 2 minutes. The sample was removed and placed in a 23° C. press with 10,000 lbs of pressure to cool. Then the sample was removed from the mold and conditioned for 24 hours at 23° C. with 50% humidity before measuring elongational viscosity.

Sample strips measuring 4 mm by 12 mm strips were cut into the compression molded 2 mm films. These were each loaded into a TA Instruments DHR-2 with a SER3 universal testing platform attachment. The sample received a temperature soak of 170° C. for 180 seconds, and then an extensional rate of 0.1 $s^{-1}$ at 170° C. was applied to a final strain of 4.0. The peak elongational viscosity measured according to this method was reported as the elongational viscosity value in the following examples. The method and apparatus (Sentmanat Extension Rheometer) for measuring the elongational viscosity are also described in U.S. Pat. Nos. 6,578,413 and 6,691,569, the contents of both of which are incorporated by reference herein for all purposes.

Example 1. Effect of Processing Temperature on Elongational Viscosity

A 2.8 MFI polypropylene homopolymer (PP) was compounded with zinc diacrylate and zinc oxide in a 20 mm Brabender twin-screw extruder. The samples also included 0.1 wt % by total weight of the composition of Irganox® 1010 (BASF) as an antioxidant. The barrel temperature profile in the extruder was controlled to achieve a range of compounding (i.e., processing) melt temperatures that ranged between 185° C. and 260° C. Sheet specimens of the pelletized material were prepared by compression molding as described above. Elongational viscosity of the sheet specimens was measured as described above at a strain rate of 0.1 $s^{-1}$ at 170° C. It was unexpectedly observed that the magnitude of the elongational viscosity displayed a local maximum at a processing temperature of 230° C. and that the processing temperature dependence of the elongational viscosity was not monotonic.

The maximum values of the elongational viscosities were 344,000, 1,536,000 and 676,000 Pa·s at processing temperatures of 200° C., 230° C., and 260° C., respectively. For control resin compositions (containing no zinc diacrylate and no zinc oxide), the maximum values of the elongational viscosities were 83,000, 67,000 and 41,000 Pa·s at processing temperatures of 200° C., 230° C., and 260° C., respectively. This data is plotted in the FIGURE, showing both the maximum in elongational viscosity at 230° C., as well as the effect of zinc diacrylate to increase the elongational viscosity compared to the samples made without zinc diacrylate. In addition, differential scanning calorimetry (DSC) was performed on the control (no zinc diacrylate/zinc oxide added to the polypropylene) and the sample having zinc diacrylate and zinc oxide added to the polypropylene. Table 1 shows the thermal properties as measured by the DSC scans.

Table 1: DSC Results Example 1

TABLE 1

| | DSC Results Example 1 | | | | | |
|---|---|---|---|---|---|---|
| | Melting | | | Crystallization | | |
| SAMPLE | Onset ° C. | Enthalpy J/gm | Peak ° C. | Onset ° C. | Enthalpy J/gm | Peak ° C. |
| Control PP | 151.87 | 68.79 | 162.00 | 120.40 | 80.67 | 115.56 |
| PP, 2% wt % zinc diacrylate, 0.04 wt % ZnO* | 151.88 | 75.99 | 162.55 | 127.93 | 81.35 | 121.78 |

*based on 2 wt % ZnO based on the total weight of the zinc diacrylate.

Example 2: Effect of the Addition of Zinc Oxide to the Polypropylene

The zinc diacrylate and zinc oxide were compounded with the 2.8 MFI polypropylene homopolymer as described above using a compounding temperature of 230° C. The samples also included 0.1 wt % based on the total composition of Irganox® 1010 (BASF) as an antioxidant. This resulted in a compounded polypropylene having 35% less free acrylic acid and 77% increase in elongational viscosity, i.e., 2,719,000 Pa·s, demonstrating that the presence of an acid neutralizer during reactive blending of polypropylene and acrylate further improves melt strength.

Example 3. Effect of the Amount of Zinc Oxide on Elongational Viscosity

Compounding and pelletizing of samples was completed on a 20 mm Brabender twin screw extruder with a length to diameter of 40 to 1. The samples also included 0.1 wt % of Irganox® 1010 (BASF) as an antioxidant. The screw profile consisted of forwarding elements with three sections mixing blocks that are 60 mm long. These mixing blocks started on the screw at 150 mm, 320 mm, and 540 mm, from the feed throat.

A flat temperature profile was used, shown in the table below, starting with a cooled feed throat. The barrel temperature is shown below. Processing temperature was reported as the majority setting of the temperature zones, i.e., 230° C.

Table 2: Example 3 Extruder Temperature Profile

TABLE 2

Example 3 extruder temperature profile

| Zone 1 °C. | Zone 2 °C. | Zone 3 °C. | Zone 4 °C. | Adapter °C. | Die °C. |
|---|---|---|---|---|---|
| 160 | 220 | 230 | 230 | 230 | 230 |

The samples made are shown in the table below. In 2.8 MFI polypropylene homopolymer, adding zinc oxide and zinc diacrylate increased elongational viscosity when reacted during extrusion. Increasing the zinc oxide loading increased the improvement of elongational viscosity in combination with the zinc diacrylate, as shown in Table 3 below. Note that in Table 2, the amount of zinc oxide is reported as weight percent, based on the total weight of the zinc diacrylate.

TABLE 3

Example 3 compositions and elongational viscosity after processing at 230° C.

| | Additional zinc oxide wt % | Elongational Viscosity 170° C. Rate 0.1 Pa s |
|---|---|---|
| Control (no zinc acrylate and no zinc oxide) | 0 | 71,500 |
| 2% zinc diacrylate + zinc oxide | 1.0 | 554,000 |
| | 5.0 | 573,000 |
| | 10.0 | 771,000 |
| 2% zinc diacrylate | 0 | 387,000 |

As can be seen above, the addition of zinc oxide to polypropylene homopolymer with zinc diacrylate improves the melt strength as measured by the elongational viscosity.

What is claimed is:

1. A high melt strength resin composition comprising a) non-functionalized polypropylene, b) at least one acrylate comprising at least one of zinc diacrylate, calcium diacrylate or aluminum triacrylate in a total amount of from 0.1 to 5% by weight based on the weight of non-functionalized polypropylene, and c) at least one acid neutralizer in a total amount of from 0.005 to 5% by weight based on the total weight of the at least one acrylate.

2. The high melt strength resin composition of claim 1, wherein the acid neutralizer comprises at least one of metal oxides, metal hydroxides, alkali metal hydroxides, alkali metal carbonates, alkaline earth metal oxides, alkaline earth metal carbonates, alkali metal bicarbonates, metal carboxylates, alkali metal carboxylates, alkaline earth metal carboxylates and combinations thereof.

3. The high melt strength resin composition of claim 1, wherein the acid neutralizer comprises at least one of zinc oxide, zinc hydroxide, calcium oxide, barium oxide, magnesium oxide, titanium dioxide, sodium carbonate, sodium bicarbonate, calcium carbonate, magnesium carbonate, sodium hydroxide, potassium hydroxide, zinc salts of fatty acids, calcium salts of fatty acids, or combinations thereof.

4. The high melt strength resin composition of claim 1, wherein the at least one acid neutralizer comprises zinc oxide.

5. The high melt strength resin composition of claim 1, comprising zinc diacrylate.

6. The high melt strength resin composition of claim 1, wherein the resin composition is free of organic peroxide.

7. The high melt strength resin composition of claim 1, wherein the non-functionalized polypropylene has a melt flow index (MFI) of from 0.2 to 2000 g/10 min (2.16 Kg, 230° C.).

8. The high melt strength resin composition of claim 1, wherein the non-functionalized polypropylene is at least one of polypropylene homopolymers, polypropylene copolymers, or alloys of polypropylene with at least one additional polymer.

9. The high melt strength resin composition of claim 1, wherein the non-functionalized polypropylene is prepared using at least one Ziegler-Natta catalyst.

10. The high melt strength resin composition of claim 1, wherein the non-functionalized polypropylene is prepared using at least one metallocene catalyst.

11. The high melt strength resin composition of claim 1, wherein the non-functionalized polypropylene is prepared using free-radical initiation.

12. The high melt strength resin composition of claim 1, comprising 0.5 to 3% by weight of the at least one acrylate.

13. The high melt strength resin composition of claim 1, additionally comprising one or more of antioxidants, fillers other than acid neutralizers, colorants other than acid neutralizers, fire retardants other than acid neutralizers, blowing agents other than acid neutralizers, clarifiers, anti-scratch additives, anti-dust additives, nucleating agents, or stabilizers.

14. A method of making a high melt strength polypropylene, comprising the step of
compounding, at a processing temperature between 185° C. and 260° C., a resin composition comprised of
a) non-functionalized polypropylene;
b) at least one acrylate comprising at least one of zinc diacrylate, calcium diacrylate and aluminum triacrylate in a total amount of from 0.1 to 5% by weight based on the weight of the non-functionalized polypropylene; and
c) at least one acid neutralizer in a total amount of from 0.005 to 5% by weight based on the total weight of the at least one acrylate.

15. The method of claim 14, wherein the processing temperature is between 220° C. and 240° C.

16. The method of claim 14, wherein the processing temperature is about 230° C.

17. The method of claim 14, wherein the compounding is carried out using a single or twin screw extruder, a banbury mixer, or a roll mill.

18. The method of claim 14, wherein the at least one of the zinc diacrylate, calcium diacrylate or aluminum triacrylate; or the acid neutralizer are in the form of a masterbatch comprising a polyolefin as a carrier resin for the masterbatch.

19. The method of claim 14, wherein the resin composition is melt extruded.

20. The method of claim 14, whereby an acrylate moiety from the at least one of the zinc diacrylate, calcium diacrylate or aluminum triacrylate is grafted to the non-functionalized polypropylene as a result of the compounding.

21. A high melt strength polypropylene obtained by compounding a resin composition comprised of a) non-functionalized polypropylene, b) at least one acrylate comprising at least one of zinc diacrylate, calcium diacrylate or aluminum triacrylate in an amount of from 0.1 to 5% by weight based on the weight of the non-functionalized polypropylene, and c) at least one acid neutralizer in a total amount of from 0.005 to 5% by weight based on the total weight of the at least one acrylate at a processing temperature between 185° C. and 260° C.

22. The high melt strength polypropylene of claim 21, wherein the processing temperature is between 220° C. and 240° C.

23. The high melt strength polypropylene of claim 21, wherein the processing temperature is about 230° C.

24. The high melt strength polypropylene of claim 21, having an elongational viscosity of at least 1,000,000 Pa·s measured at a strain rate of 0.1 s$^{-1}$ at 170° C.

25. The high melt strength polypropylene of claim 21, having an elongational viscosity of at least 500,000 Pa·s measured at a strain rate of 0.1 s$^{-1}$ at 170° C.

26. The high melt strength polypropylene of claim 21, having an elongational viscosity at least 25% higher than an elongational viscosity of the non-functionalized polypropylene measured at a strain rate of 0.1 s$^{-1}$ at 170° C.

27. The high melt strength polypropylene of claim 21, having an elongational viscosity measured at a strain rate of 0.1 s$^{-1}$ at 170° C. of from 25% to 2000% higher than an elongational viscosity of the non-functionalized polypropylene.

28. The high melt strength polypropylene of claim 21, wherein the compounding is carried out using a single or twin screw extruder, a banbury mixer, or a roll mill.

29. The high melt strength polypropylene of claim 21, wherein the resin composition is melt extruded.

30. The high melt strength polypropylene of claim 21, wherein an acrylate moiety from the zinc diacrylate, calcium diacrylate or aluminum triacrylate is grafted to the non-functionalized polypropylene to provide acrylate-functionalized polypropylene chains and grafted acrylate groups on the acrylate-functionalized polypropylene chains are present in the form of polyvalent metal or alkaline earth metal salts.

31. The high melt strength polypropylene of claim 21, wherein the at least one of the zinc diacrylate, calcium diacrylate or aluminum triacrylate; or the acid neutralizer are in the form of a masterbatch comprising a polyolefin as a carrier resin for the masterbatch.

32. A polymeric article comprising the high melt strength polypropylene of claim 21.

33. The polymeric article of claim 32, wherein the polymeric article is a foamed article, a sheet extruded article, a thermoformed article, a blow molded article, a roto-molded article, an extrusion-coated article, a cast article, an injection molded article, a pressed article, a fiber or a film.

34. The high melt strength resin composition of claim 1, comprising from 0.1 to 2% by weight of the at least one acrylate based on the weight of non-functionalized polypropylene, and from 0.005 to 2% by weight of the at least one acid neutralizer based on the total weight of the at least one acrylate.

* * * * *